US012176606B2

(12) United States Patent
Morscher et al.

(10) Patent No.: US 12,176,606 B2
(45) Date of Patent: Dec. 24, 2024

(54) ROOF ANTENNA FOR A VEHICLE

(71) Applicant: AUDI AG, Ingolstadt (DE)

(72) Inventors: Christian Albert Morscher, Karlshuld (DE); Lars Reichardt, Wettstetten (DE)

(73) Assignee: AUDI AG, Ingolstadt (DE)

( * ) Notice: Subject to any disclaimer, the term of this patent is extended or adjusted under 35 U.S.C. 154(b) by 660 days.

(21) Appl. No.: 17/281,873

(22) PCT Filed: Sep. 4, 2019

(86) PCT No.: PCT/EP2019/073506

§ 371 (c)(1),
(2) Date: Mar. 31, 2021

(87) PCT Pub. No.: WO2020/078611

PCT Pub. Date: Apr. 23, 2020

(65) Prior Publication Data

US 2022/0037774 A1 Feb. 3, 2022

(30) Foreign Application Priority Data

Oct. 17, 2018 (DE) ..................... 10 2018 217 717.1

(51) Int. Cl.
*H01Q 1/32* (2006.01)
*H01Q 1/42* (2006.01)

(52) U.S. Cl.
CPC ............. *H01Q 1/3275* (2013.01); *H01Q 1/42* (2013.01)

(58) Field of Classification Search
CPC .................................................... H01Q 1/3275
See application file for complete search history.

(56) References Cited

U.S. PATENT DOCUMENTS 6,204,820 B1 * 3/2001 Jensen, Jr. ........... H01Q 1/3275 296/180.1
6,714,171 B2 * 3/2004 Haussler .............. H01Q 1/1214 343/715
8,462,059 B2 6/2013 Schnuerer
9,178,272 B2 11/2015 Chakam et al.
(Continued)

FOREIGN PATENT DOCUMENTS

CN 207038734 U * 2/2018 ............... H01Q 1/12
DE 20111229 U1 * 10/2001 ........... H01Q 1/1214
(Continued)

OTHER PUBLICATIONS

International Search Report and Written Opinion directed to related International Patent Application No. PCT/EP2019/073506, mailed Nov. 25, 2019, with attached English-language translation; 16 pages.

(Continued)

*Primary Examiner* — Ricardo I Magallanes
(74) *Attorney, Agent, or Firm* — Sterne, Kessler, Goldstein & Fox P.L.L.C.

(57) ABSTRACT

Disclosed is a roof antenna for a vehicle, comprising an electronics module and a separate antenna cap for protecting the electronics module or as a design element, said cap being provided with a positioning means for positioning the antenna cap on a roof panel of a vehicle. Also disclosed is an antenna assembly comprising a roof antenna and a roof panel of a vehicle.

14 Claims, 2 Drawing Sheets

(56) References Cited

U.S. PATENT DOCUMENTS

| | | | | | |
|---|---|---|---|---|---|
| 9,793,602 | B2 * | 10/2017 | Aminzadeh | H01Q 5/40 | |
| 11,705,623 | B2 * | 7/2023 | Sczesny | H01Q 1/3275 | 343/713 |
| 2008/0111752 | A1 * | 5/2008 | Lindackers | H01Q 5/371 | 343/872 |
| 2008/0122708 | A1 * | 5/2008 | Lindackers | H01Q 1/1214 | 343/713 |
| 2010/0231467 | A1 * | 9/2010 | Schnuerer | H01Q 1/1214 | 343/713 |
| 2012/0274519 | A1 * | 11/2012 | Chakam | H01Q 1/3275 | 343/702 |
| 2015/0123854 | A1 * | 5/2015 | Chakam | H01Q 1/1214 | 343/702 |
| 2017/0104264 | A1 * | 4/2017 | Kobayashi | H01Q 1/42 | |

FOREIGN PATENT DOCUMENTS

| | | | | | |
|---|---|---|---|---|---|
| DE | 10009978 | C2 | * | 11/2002 | H01Q 1/1214 |
| DE | 4403643 | C2 | * | 4/2003 | H01Q 1/3283 |
| DE | 10210628 | C1 | * | 10/2003 | B60R 11/00 |
| DE | 202004004740 | U1 | * | 10/2004 | H01Q 1/1207 |
| DE | 102006015923 | A1 | | 11/2006 | |
| DE | 102009050944 | A1 | * | 5/2010 | H01Q 1/1221 |
| DE | 102009012641 | A1 | | 9/2010 | |
| DE | 102009051605 | A1 | | 5/2011 | |
| DE | 102016208726 | A1 | * | 11/2016 | H01Q 1/1214 |
| EP | 1715545 | A1 | * | 10/2006 | H01Q 1/1214 |
| EP | 1760826 | A2 | * | 3/2007 | H01Q 1/1214 |
| EP | 3667812 | A1 | * | 6/2020 | H01Q 1/3275 |
| KR | 20150122475 | A | | 11/2015 | |
| WO | WO-2010084105 | A1 | * | 7/2010 | H01Q 1/1214 |
| WO | WO 2013/090783 | A1 | | 6/2013 | |
| WO | WO-2019026483 | A1 | * | 2/2019 | B60R 11/02 |

OTHER PUBLICATIONS

International Preliminary Report on Patentability directed to related International Patent Application No. PCT/EP2019/073506, completed Jan. 29, 2021, with attached English-language translation; 14 pages.

* cited by examiner

ROOF ANTENNA FOR A VEHICLE

TECHNICAL FIELD

The present disclosure relates to a roof antenna for a vehicle, comprising an electronics module and a separate antenna cap for protecting the electronics module, which has a positioning means for positioning the antenna cap on a roof panel of a vehicle. The present disclosure also relates to an antenna assembly having a roof antenna and a roof panel of a vehicle.

BACKGROUND

Roof antennas are installed in a large number of vehicles and allow a vehicle to communicate wirelessly with external radio stations, for example other vehicles, base stations of a mobile radio network, or satellites. Accordingly, there are various designs of roof antennas and antenna assemblies, some of which differ greatly in terms of their structure and installation.

For example, DE 10 210 628 C1 discloses an antenna assembly comprising a roof antenna and a roof panel of a vehicle. The roof antenna has a housing and antenna electronics integrated into the housing as well as a threaded bolt formed on the housing, an installation clip, and a nut. To install the roof antenna, the installation clip is pushed onto the threaded bolt, the threaded bolt is passed through a passage in the roof panel and the nut is screwed onto the threaded bolt to fix the roof antenna to the roof panel. The installation clip prevents the roof antenna from turning when the nut is screwed on, so that the roof antenna can be installed by one person alone.

This roof antenna is easy to install. However, it must be completely detached and replaced if necessary.

DE 10 2006 015 923 A1 discloses a different type of antenna assembly comprising a roof antenna and a roof panel of a vehicle. The antenna assembly further comprises positioning means which, in the properly installed state, pass through passages in the roof panel that are flush with one another and a printed circuit board carrying antenna electronics and are fastened to an antenna cap of the roof antenna and latched to the roof panel.

In this case, the antenna cap and antenna electronics can be detached from one another and each can be replaced individually. But even in such a case, the roof antenna must be completely detached.

DE 10 2016 208 726 A1 is devoted to another problem of roof antennas. It discloses an antenna assembly with a roof antenna and a roof panel of a vehicle. The roof antenna comprises a base plate which carries antenna electronics and has a flat surface on its underside. The base plate has two fastening regions which are arranged at a distance from one another. A fastening region comprises a fastening element for fastening the roof antenna to the roof panel. Furthermore, the antenna assembly comprises a spacer element assigned to the fastening element in order to set a distance between the roof antenna and the roof panel at the location of the fastening region. In this way, a curvature of the roof panel is compensated.

This roof antenna can therefore be installed on a curved roof panel without either the installed roof antenna having play or the curved roof antenna being deformed by the installed roof antenna. It must also be completely detached if repair is required.

The roof antennas described above therefore have in common that the roof antenna must be completely detached from the roof panel of the vehicle, even if only the antenna electronics or the antenna cap have to be repaired or replaced.

DE 10 2009 012 641 A1 and DE 10 2009 051 605 A1 each disclose an antenna for a vehicle which comprise an electronics module and a separate antenna cap. The antenna cap comprises positioning means for positioning the antenna cap on a body part or on an outside of the vehicle.

BRIEF DESCRIPTION OF DRAWINGS/FIGURES

DETAILED DESCRIPTION

Figure 1:
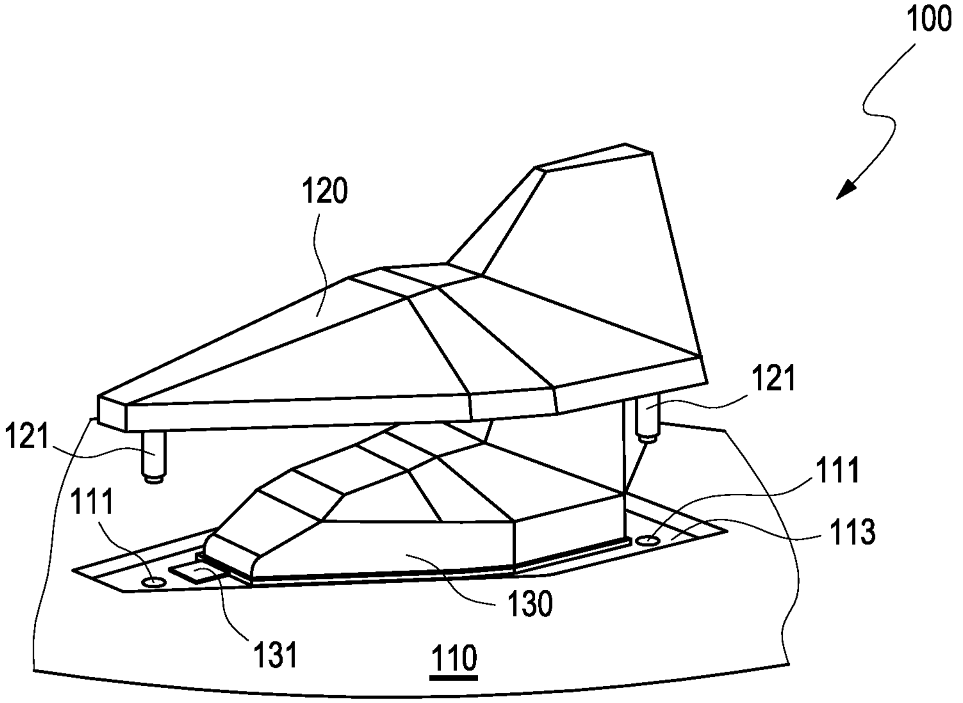
FIG. 1 is a schematic illustration of a perspective exploded view of a first embodiment of the antenna assembly according to some embodiments.

The present disclosure is therefore based on the object of providing an improved roof antenna which is inexpensive to manufacture and easy to use. In addition, it is the object of the present disclosure to specify an improved antenna assembly.

The present disclosure relates to a roof antenna for a vehicle, comprising an electronics module and a separate antenna cap for protecting the electronics module, which has a positioning means for positioning the antenna cap on a roof panel of a vehicle. By way of a non-limiting example, the roof antenna is designed in at least two parts and accordingly comprises two components. Due to its shape and color, the antenna cap also has an important design function and substantially determines the aesthetics of the roof antenna that can be perceived from the outside. The positioning means of the antenna cap makes it easier to install the antenna cap on the roof panel and ensures a precise position of the installed antenna cap. The electronics module comprises all the electronic circuits provided for operating the roof antenna, for example, receiving amplifiers such as a low noise amplifier (LNA), and is designed to be waterproof. Because of the two-part design of the roof antenna, different antenna caps can be combined with different electronics modules, which means that not every required variant of the roof antenna has to be provided in a pre-installed state.

In the roof antenna according to some embodiments, the positioning means is arranged at a distance from the electronics module in the properly installed state of the roof antenna. The positioning means of the antenna cap and the electronics module are therefore not directly connected to one another when the roof antenna is installed. Accordingly, no positioning means of the electronics module is directly connected to the antenna cap when the roof antenna is installed. Because of the positioning means that are independent of the respective other component, both the antenna cap and the electronics module can be individually detached and, for example, replaced in the installed state. By way of a non-limiting example, this assembly of the positioning means of the roof antenna allows for an exclusive detachment of a single component of the roof antenna.

In some embodiments, the antenna cap and the electronics module have corresponding latching means which are designed to detachably connect the antenna cap and the electronics module. The latching means have the effect that no tools or at most a simple screwdriver are required to connect the antenna cap and the electronics module, which makes handling of these two components easier during installation. By way of a non-limiting example, by means of the latching connection of the antenna cap and the electronics module, pre-installed combinations can be provided for the installation onto the roof panel.

In some embodiments, the antenna cap has exactly one positioning means which protrudes from the antenna cap and is designed to pass through a passage in the roof panel in the properly installed state of the roof antenna. The positioning means can protrude from an inner surface of the antenna cap and in particular have the shape of a bolt or peg, i.e., it can be designed substantially as an elongated cylinder. Such simple shapes can be produced easily and inexpensively.

In some embodiments, the positioning means has at its free end a latching means extending transversely to a longitudinal direction of the positioning means for latching with the roof panel. The latching means protrudes laterally from the positioning means and can be designed, for example, as a spherical latching head. By way of a non-limiting example, less symmetrical latching means can also be provided at the free end of the positioning means.

In some embodiments, a roof antenna comprises a first sealing element which is designed to be passed through by the positioning means and which is arranged between the antenna cap and the roof panel in the properly installed state of the roof antenna. The first sealing element can be designed, for example, as a cylindrical sleeve and, in the properly installed state of the roof antenna, seals the passage of the roof panel through which the positioning means passes.

In some embodiments, a roof antenna comprises a second sealing element which is designed to enclose a connection region of the electronics module, and is arranged between the electronics module and the roof panel in the properly installed state of the roof antenna. The second sealing element can be designed, for example, as a circular ring disk and, in the properly installed state of the roof antenna, seals a gap between the electronics module and the roof panel.

In some embodiments, the first and the second sealing element can comprise an in particular elastic plastics material, for example, an elastomer and a rubber. Elastic plastics material have an excellent sealing effect. The two sealing elements protected the passages from the ingress of humidity, rainwater, and the like.

The roof antenna comprises expediently a clamping element which can be detachably fastened to the connection region of the electronics module and which is designed to engage under the roof panel in the properly installed state of the roof antenna. For this purpose, the clamping element can have, for example, a central fastening region that can be screwed to the connection region and clamping portions protruding therefrom which, in particular with regard to their length, are designed to engage under the roof panel. As a result of engaging under the roof panel, the roof antenna is held firmly to the roof panel after attaching the clamping element.

In some embodiments, an antenna assembly is disclosed. The antenna assembly includes a roof antenna and a roof panel of a vehicle, which has an elevation corresponding to an edge contour of the antenna cap for placing the antenna cap, the base of which has a passage corresponding to the positioning means and a passage corresponding to the connection region of the electronics module, wherein the antenna cap is latched to the electronics module and the positioning means to the roof panel and the electronics module is detachably fastened to the roof panel by means of the clamping element. The antenna assembly is easy to install and maintain, and the installation does not require adhesive. The elevation formed in the roof panel can be stamped inexpensively; the passages formed in the base of the elevation can be produced inexpensively by punching or cutting. The elevation counteracts the formation of waterlogging in the region of the sealing elements.

In some embodiments, by way of a non-limiting example, the antenna cap of the roof antenna has three positioning means or a plurality of positioning means in a number other than three, which protrude from the antenna cap, are arranged at a distance from one another, and are designed to pass through a passage in the roof panel in the properly installed state of the roof antenna. Three positioning means can make the antenna cap easy to handle when installing the roof antenna. Apart from this, a plurality or, in particular, three positioning means increase the precision of the position of the installed roof antenna.

In some embodiments, by way of a non-limiting example, the antenna assembly comprises a roof antenna and a roof panel of a vehicle which has a recess for the insertion of the antenna cap corresponding to an edge contour of the antenna cap, the base of which has passages corresponding to the positioning means and a passage corresponding to an outer contour of the electronics module, wherein the antenna cap and the electronics module are inserted into the roof panel from opposite sides, the antenna cap having the roof panel is glued along the edge contour thereof, and the electronics module is detachably fastened to the roof panel. The antenna assembly is easy to install and maintain. The recess formed in the roof panel can be stamped inexpensively; the two passages formed in the base of the elevation can be produced inexpensively by punching or cutting. Gluing the antenna cap to the roof panel seals the gap formed between the edge of the antenna cap and the roof panel and protects the passages of the roof panel, which are completely enclosed by the gap sealed by means of an adhesive, from the ingress of humidity, rainwater, and the like. Due to the gluing of the antenna cap, other types of fastening elements are unnecessary. In addition, the electronics module does not have to be designed to be waterproof itself.

Because the antenna cap and the electronics module are mechanically decoupled from one another, they can be detached from an installed roof antenna and replaced independently of one another, i.e., individually resulting in the simple manufacture and installation, which is associated with low costs and a low expenditure of time.

FIG. 1 is a schematic illustration of a perspective exploded view of a first embodiment of the antenna assembly 100. The antenna assembly 100 is intended for the installation on a vehicle and comprises a roof antenna and a roof panel 110 of the vehicle.

The roof antenna comprises an electronics module 130 and a separate dome-shaped antenna cap 120 for protecting the electronics module 130. In the properly installed state of the antenna assembly 100, the antenna cap 120 and the electronics module 130 are inserted into the roof panel 110 from opposite sides.

Figure 2:
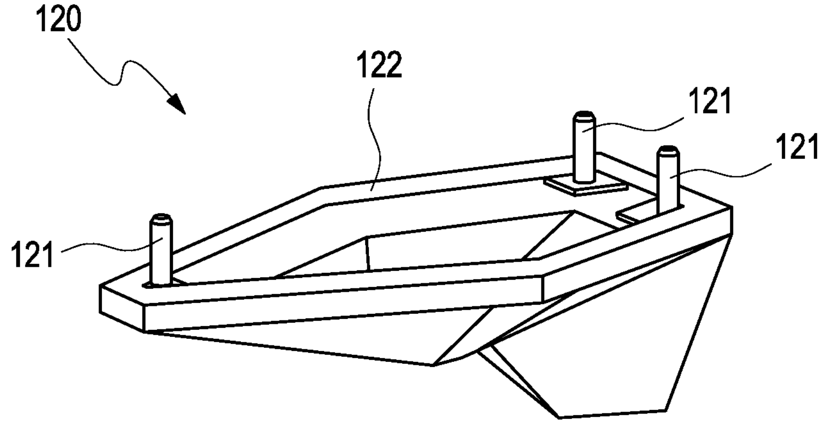
FIG. 2 is a schematic illustration of a perspective bottom view of the antenna cap of the roof antenna of the antenna assembly shown in FIG. 1 according to some embodiments.

FIG. 2 is a schematic illustration of a perspective bottom view of the antenna cap 120 of the roof antenna of the antenna assembly 100 shown in FIG. 1. The antenna cap 120 has three positioning means 121, each in the form of a bolt or peg, for positioning the antenna cap 120 on the roof panel 110 of the vehicle. The positioning means 121 protrude from the antenna cap 120 and are arranged at a distance from one another. A double-sided adhesive tape 122 or an adhesive bead (e.g. windscreen adhesive) is arranged along the edge contour of the antenna cap 120 and is glued to the edge of the antenna cap 120 on one side.

The roof panel 110 has a recess 113 corresponding to an edge contour of the antenna cap 120, the base of which has passages 111 corresponding to the positioning means 121 and a passage 112 corresponding to an outer contour of the electronics module 130. In the properly installed state of the roof antenna, the positioning means 121 are arranged at a distance from the electronics module 130 and are designed to each pass through a passage 111 of the roof panel 110 in the properly installed state of the roof antenna.

Figure 3:
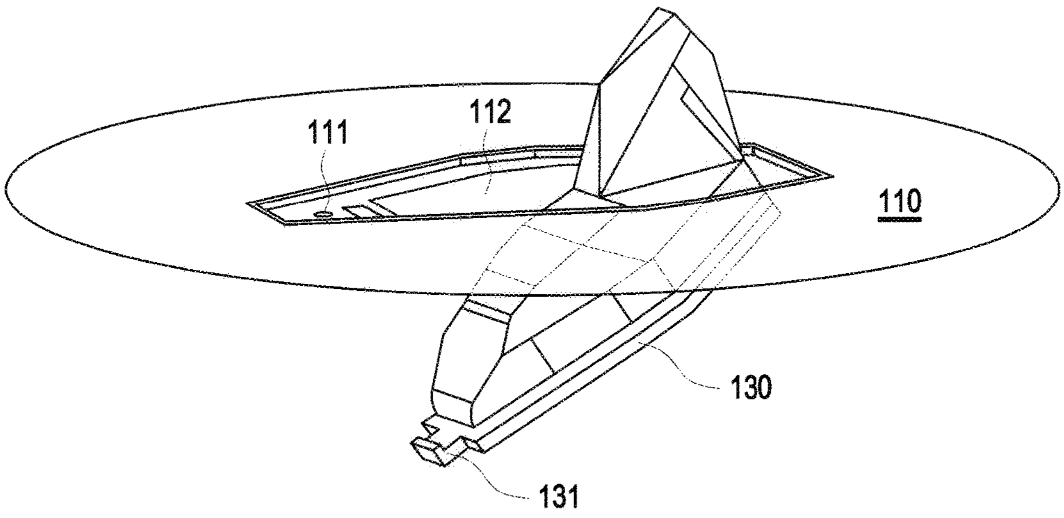
FIG. 3 is a schematic illustration of a perspective view of the electronics module of the roof antenna of the antenna assembly shown in FIG. 1 according to some embodiments.

FIG. 3 shows, in a schematic illustration, a perspective view of the electronics module 130 of the roof antenna of the antenna assembly 100 shown in FIG. 1 during installation.

For the installation of the roof antenna on the roof panel 110, i.e., to produce the antenna assembly 100, the antenna cap 120 and the electronics module 130 are inserted into the roof panel 110 from opposite sides. For this purpose, the antenna cap 120 is inserted into the recess 113 of the roof panel 110 in such a way that the positioning means 121 engage into the passages 111 of the roof panel, whereby the antenna cap is positioned in the recess 113. When the antenna cap 120 comes into contact with the base of the recess 113, it is glued to the roof panel 110 along its edge contour by means of the double-sided adhesive tape 122 or the adhesive bead (e.g., window adhesive). In this way, a liquidproof connection between the antenna cap 120 and the roof panel 110 is created. Since the passages 111 are completely enclosed by the glued edge contour in the installed state of the antenna cap 120, i.e., since the edge contour is arranged on the outside relative to the passages 111, the passages 111 are protected from the ingress of humidity, rainwater, and the like.

The electronics module 130 is detachably fastened to the roof panel 110 by being connected to the roof panel 110 in a pivotable manner, for example, suspended, and then pivoted into the intended position. In the intended position, the electronics module 130 is then fixated by means of a fastening means, in this case a screw-type latching means 131. The electronics module 130 and the passage 112 are also completely enclosed by the glued edge contour in the installed state of the antenna cap and protected against the ingress of humidity, rainwater, and the like.

Figure 4:
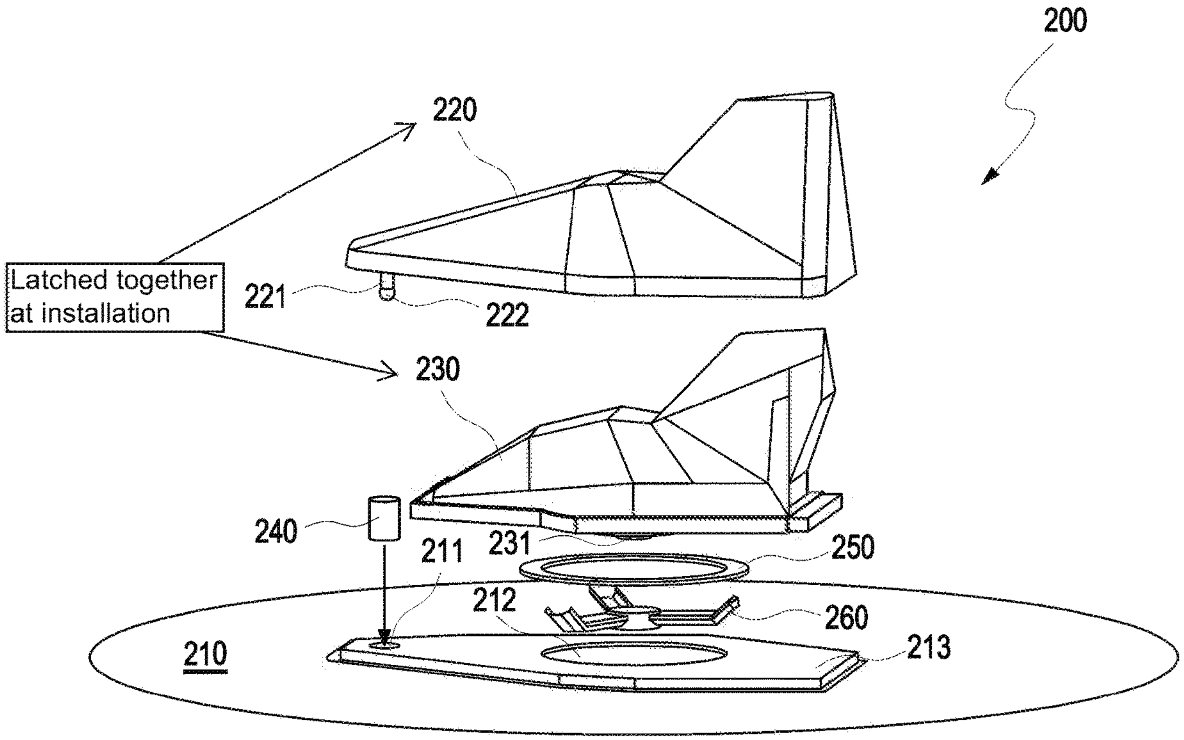
FIG. 4 is a schematic illustration of a perspective exploded view of a second embodiment of the antenna assembly according to some embodiments.

FIG. 4 is a schematic illustration of a perspective exploded view of a second embodiment of the antenna assembly 200 according to some embodiments. The antenna assembly 200 is intended for the installation on a vehicle and comprises a roof antenna and a roof panel 210 of the vehicle.

The roof antenna comprises an electronics module 230 and a separate dome-shaped antenna cap 220 for protecting the electronics module 230. The antenna cap 220 and the electronics module 230 have corresponding latching means which are designed to detachably connect the antenna cap 220 and the electronics module 230.

The roof panel 210 has an elevation 213 corresponding to an edge contour of the antenna cap 220 for placing the antenna cap 220 thereon. The base of the elevation 213 has a passage 211 corresponding to the positioning means 221 and has a passage 212 corresponding to a connection region 231 of the electronics module 230.

The antenna cap 220 has precisely one positioning means 221 in the form of a bolt or a peg for positioning the antenna cap 220 on the roof panel 210 of the vehicle. The positioning means 221 protrudes from the antenna cap 220 and is designed to pass through the passage 211 of the roof panel 210 in the properly installed state of the roof antenna. At its free end, the positioning means 221 also has a latching means 222 extending transversely to a longitudinal direction of the positioning means 221, here for example in the form of a spherical latching head, for latching with the roof panel 210.

The roof antenna further comprises a hollow cylindrical first sealing element 240, which is designed to be passed through by the positioning means 221 and is arranged between the antenna cap 220 and the roof panel 210 in the properly installed state of the roof antenna. The sealing element 240 can also be installed separately. Furthermore, the roof antenna comprises a second sealing element 250 which is designed to enclose the connection region 231 of the electronics module 230 and is arranged between the electronics module 230 and the roof panel 210 in the properly installed state of the roof antenna.

The roof antenna also comprises a clamping element 260 which can be detachably fastened to the connection region 231 of the electronics module 230 and which is designed to engage under the roof panel 210 in the properly installed state of the roof antenna. The clamping element 260 is designed merely by way of example in the form of a star with a cylindrical central portion and three radial portions which are distributed uniformly in a circumferential direction from the central portion, i.e. protrude at the same angular intervals of 120°.

In the properly installed state of the roof antenna, the antenna cap 220 is latched to the electronics module 230 and the positioning means 221 is latched to the roof panel 210, and the electronics module 230 is detachably fastened to the roof panel 210 by means of the clamping element 260. The positioning means 221 is arranged at a distance from the electronics module 230.

For the installation of the roof antenna on the roof panel 210, i.e. to produce the antenna assembly 200, the antenna cap 220 and the electronics module 230 are detachably connected to one another by means of the latching means. In a further step, the first sealing element 240 is inserted into the roof panel 210 and the second sealing element 250 is placed around the connection region of the electronics module 230. The second sealing element 250 can also be held on the electronics module 230. In this case, it does not have to be installed separately. Subsequently, the subassembly prepared in this way is arranged on the roof panel 210 in such a way that the antenna cap 220 is placed on the elevation 213, the positioning means 221 passes through the first sealing element 240 and the passage 211, whereby the latching means 222 latches into the roof panel 210, and the connection region 231 of the electronics module 230 passes through the passage 212.

In the intended position, the electronics module 230 is then detachably fastened to the roof panel 210 by means of the clamping element 260 by screwing the clamping element 260 to the connection region 231 of the electronics module 230. In this way, a liquidproof connection is created between the antenna panel 220, the electronics module 230 on the one hand, and the roof panel 210 on the other hand for protection against the ingress of humidity, rainwater, and the like.

LIST OF REFERENCE SIGNS

100 Antenna assembly
110 Roof panel

111 Passage
112 Passage
113 Recess
120 Antenna cap
121 Positioning means
122 Adhesive tape
130 Electronics module
131 Fastening means
200 Antenna assembly
210 Roof panel
211 Passage
212 Passage
213 Elevation
220 Antenna cap
221 Positioning means
222 Latching means
230 Electronics module
231 Connection region
240 First sealing element
250 Second sealing element
260 Clamping element

The invention claimed is:

1. An antenna assembly, comprising:

a roof panel of a vehicle;

a clamping element; and a roof antenna for the vehicle, the roof antenna comprising:

an electronics module; and an antenna cap configured to protect the electronics module, wherein the antenna cap comprises one or more positioning means, and wherein the antenna cap is configured to be positioned on the roof panel using the one or more positioning means of the antenna cap, wherein the antenna cap and the electronics module have corresponding latching means configured to detachably connect the antenna cap and the electronics module, wherein the electronics module comprises one or more electronic circuits configured to operate the roof antenna, wherein the roof panel has an elevation corresponding to an edge contour of the antenna cap for placing the antenna cap on the roof panel, wherein a base of the roof panel comprises a first passage corresponding to one of the one or more positioning means of the antenna cap and a second passage corresponding to a connection region of the electronics module, the connection region being configured to engage under the roof panel in an installed state of the roof antenna, wherein the clamping element is detachably fastened to the connection region of the electronics module, and wherein the antenna cap is latched to the electronics module, the one or more positioning means of the antenna cap are latched to the roof panel, and the electronics module is detachably fastened to the roof panel by means of the clamping element.

2. The antenna assembly of claim 1, wherein the one or more positioning means of the antenna cap protrude from the antenna cap, and wherein the one or more positioning means of the antenna cap are configured to pass through the first passage in the roof panel in the installed state of the roof antenna.

3. The antenna assembly of claim 2, wherein the one or more positioning means of the antenna cap comprise a latching means extending transversely to a longitudinal direction of the one or more positioning means of the antenna cap for latching to the roof panel.

4. The antenna assembly of claim 1, further comprising a first sealing element arranged between the antenna cap and the roof panel in the installed state of the roof antenna, wherein the first sealing element is configured to be passed through by a positioning means of the antenna cap.

5. The antenna assembly of claim 1, further comprising a second sealing element arranged between the electronics module and the roof panel in the installed state of the roof antenna, wherein the second sealing element is configured to enclose the connection region of the electronics module.

6. The antenna assembly of claim 1, wherein the one or more positioning means of the antenna cap are arranged at a distance from the electronics module in the installed state of the roof antenna.

7. The antenna assembly of claim 1, wherein the electronics module is configured to be waterproof.

8. The antenna assembly of claim 4, wherein the first sealing element is configured as a cylindrical sleeve and seals the first passage through which the positioning means of the antenna cap passes.

9. The antenna assembly of claim 1, wherein the clamping element is configured as a star with a central fastening region being cylindrical and having three radially protruding clamping portions that are distributed uniformly in a circumferential direction from the central fastening region.

10. The antenna assembly of claim 9, wherein the three radially protruding clamping portions protrude from the central fastening region at angular intervals of 120°.

11. The antenna assembly of claim 5, wherein the second sealing element is configured as a circular ring disk that seals a gap between the electronics module and the roof panel.

12. The antenna assembly of claim 4, wherein the first sealing element is formed of an elastomer and a rubber.

13. The antenna assembly of claim 5, wherein the second sealing element is formed of an elastomer and a rubber.

14. The antenna assembly of claim 1, wherein the clamping element comprises:

a central fastening region that is configured to screw to the connection region; and clamping portions that protrude radially from the central fastening region, the clamping portions being configured to engage under the roof panel in the installed state of the roof antenna.

* * * * *